UNITED STATES PATENT OFFICE.

ROBERT WIMMER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

ALKALI SALT OF INDIGO WHITE AND PROCESS OF MAKING SAME.

No. 833,654.     Specification of Letters Patent.     Patented Oct. 16, 1906.

Application filed April 17, 1906. Serial No. 312,209.

*To all whom it may concern:*

Be it known that I, ROBERT WIMMER, doctor of philosophy and chemist, a subject of the King of Bavaria, residing at Ludwigshafen-on-the-Rhine, Kingdom of Bavaria, German Empire, have invented new and useful Improvements in Alkali Salts of Indigo White and Processes for Making the Same, of which the following is a specification.

I have discovered that by evaporating in a vacuum a neutral solution of the disodium salt or of the monosodium salt of indigo white or of a mixture of these two salts I can obtain a new dry product which is stable in the air and which readily redissolves in water, yielding a solution which can be used directly for dyeing without further treatment with a reducing agent. Other soluble reduced forms of indigo have already been prepared and brought on the market—for example, indigo white itself in the form of a paste and also solutions of alkali salts of indigo white; but these are only slightly stable in the air, being very easily oxidized into insoluble indigo. The fact which I have discovered that the new dry alkali salts of indigo white are stable in the presence of air is all the more remarkable, since indigo white itself is more unstable when dried than it is when in the form of a paste, and a paste of an alkali salt of indigo white is less stable than a paste of indigo white itself.

In carrying out my invention the solution of the alkali salt of indigo white is preferably evaporated in thin layers, as the water is then more easily removed. Better results are obtained when working with the monosodium salt or with a mixture of this with the disodium salt than when the disodium salt alone is employed. The solutions which are obtained by reducing indigo with finely-divided iron in the presence of caustic alkali are very suitable for the purposes of this invention, as they contain no other salts and also no excess of alkali. The dried product so obtained can, if desired, be mixed with quicklime, so as to produce a product containing the equivalent of a definite percentage of indigo.

The following example will serve to further illustrate the nature of my invention and how it can be carried into practical effect; but my invention is not confined to this example. The parts are by weight. Prepare a solution of the alkali salt of indigo white by reducing fifty (50) parts of indigo pure B. A. S. F. in powder with twenty-five (25) parts of iron powder, twelve (12) parts of caustic soda, and sixty-four (64) parts of water and then filtering off the iron mud. Evaporate this solution in a vacuum at a temperature of from eighty (80°) to ninety (90°) degrees centigrade until water ceases to be given off. Upon cooling, a brittle product is obtained, which in thin layers is transparent and has a red color. It is easily soluble in water, and the solution obtained can be used directly for dyeing vegetable fiber.

Now what I claim is—

1. The process for the production of solid dry stable alkali salts of indigo white by evaporating in a vacuum a solution of an alkali salt of indigo white.

2. As new articles of manufacture solid dry alkali salts of indigo white, which salts are stable in the air and are easily soluble in water yielding vats which dye vegetable fiber directly.

In testimony whereof I have hereunto set my hand in the presence of two subscribing witnesses.

ROBERT WIMMER.

Witnesses:
    J. ALEC. LLOYD,
    ERNEST F. EHRHARDT.